United States Patent
Kim et al.

(10) Patent No.: US 10,744,854 B2
(45) Date of Patent: Aug. 18, 2020

(54) AIR CONDITIONING SYSTEM FOR VEHICLE AND METHOD FOR CONTROLLING SAME

(71) Applicant: HANON SYSTEMS, Daejeon (KR)

(72) Inventors: Hyeon Gyu Kim, Daejeon (KR); Doo Hoon Kim, Daejeon (KR); Chul Hee Kim, Daejeon (KR); Jae Chun Ryu, Daejeon (KR); Sung Je Lee, Daejeon (KR); Young Hum Han, Daejeon (KR); Joong Man Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 16/072,216

(22) PCT Filed: Jul. 21, 2017

(86) PCT No.: PCT/KR2017/007861
§ 371 (c)(1),
(2) Date: Jul. 24, 2018

(87) PCT Pub. No.: WO2018/016902
PCT Pub. Date: Jan. 25, 2018

(65) Prior Publication Data
US 2019/0168579 A1    Jun. 6, 2019

(30) Foreign Application Priority Data

Jul. 22, 2016  (KR) .................. 10-2016-0093189

(51) Int. Cl.
*B60H 1/32*  (2006.01)
*F25B 5/02*  (2006.01)
(Continued)

(52) U.S. Cl.
CPC ....... *B60H 1/3205* (2013.01); *B60H 1/00007* (2013.01); *B60H 1/00057* (2013.01);
(Continued)

(58) Field of Classification Search
CPC .. B60H 1/323; B60H 1/2225; B60H 1/00899; B60H 1/00385; B60H 1/00921;
(Continued)

(56) References Cited

U.S. PATENT DOCUMENTS

| 7,797,958 B2 * | 9/2010 | Alston ............... B60H 1/00428 165/43 |
| 2015/0082820 A1 * | 3/2015 | Takahashi ............ B60H 1/0005 62/238.7 |
| 2016/0059666 A1 * | 3/2016 | Chen ........................ F28F 9/00 62/238.7 |

FOREIGN PATENT DOCUMENTS

| JP | H1035263 A | 2/1998 |
| JP | 2004001674 A | 1/2004 |

(Continued)

OTHER PUBLICATIONS

Kim Kwang Ho, Air-conditioner frozen oil cyclic improvement expansion valve, has front air conditioning device equipped with compressor, pipe line, front expansion valve, Derwent, English Translation (Year: 2008).*

(Continued)

*Primary Examiner* — Steve S Tanenbaum
(74) *Attorney, Agent, or Firm* — Dickinson Wright PLLC

(57) ABSTRACT

The present invention relates to an air conditioning system for a vehicle and a method for controlling the same and, more specifically, to an air conditioning system for a vehicle and a method for controlling the same in which an opening/closing valve and an expansion valve are installed on a branch line connecting a first air conditioning unit and a second air conditioning unit, the opening/closing valve is always open so as to always supply a refrigerant to the second air conditioning unit during a cooling mode, and the opening/closing valve is always closed so as to always block the refrigerant supply to the second air conditioning unit (Continued)

during a heating mode, such that the refrigerant flows into the branch line of the second air conditioning unit even during a single cooling mode, thereby solving the problem wherein the pressure of a compressor increases, oil is forcibly circulated through a notch of the expansion valve, thereby solving the problem wherein the oil circulation rate decreases, and the refrigerant supply to the second air conditioning unit is blocked during a dual heating mode, thereby solving the problem wherein the heating performance of an electric heating type heater decreases when the second air conditioning unit is operated.

15 Claims, 5 Drawing Sheets

(51) Int. Cl.
    *F25B 6/04*     (2006.01)
    *B60H 1/00*     (2006.01)
    *F25B 13/00*     (2006.01)
    *F25B 41/04*     (2006.01)
    *F25B 49/02*     (2006.01)

(52) U.S. Cl.
    CPC ......... *B60H 1/00921* (2013.01); *B60H 1/323* (2013.01); *B60H 1/32281* (2019.05); *F25B 5/02* (2013.01); *F25B 6/04* (2013.01); *F25B 13/00* (2013.01); *F25B 41/046* (2013.01); *F25B 49/02* (2013.01); *B60H 1/00914* (2013.01); *B60H 2001/00942* (2013.01); *F25B 41/04* (2013.01); *F25B 2400/0403* (2013.01); *F25B 2400/0409* (2013.01); *F25B 2600/2501* (2013.01); *Y02B 30/72* (2013.01)

(58) Field of Classification Search
    CPC .............. B60H 1/3205; B60H 1/32281; B60H 1/00057; B60H 1/00914; B60H 2001/00942; F25B 6/04; F25B 5/04; F25B 2341/0662; F25B 5/02; F25B 49/02; Y02B 30/72
    USPC .................................................. 62/115, 224
    See application file for complete search history.

(56) References Cited

FOREIGN PATENT DOCUMENTS

| | | |
|---|---|---|
| JP | 2004058958 A | 2/2004 |
| JP | 3581128 B2 | 10/2004 |
| JP | 3700286 B2 | 9/2005 |
| KR | 20080055474 A * | 6/2008 |

OTHER PUBLICATIONS

International Search Report and Written Opinion dated Oct. 25, 2017 from International Patent Application Serial No. PCT/KR2017/007861, with English translation of International Search Report.

* cited by examiner

PRIOR ART

FIG. 5

| Mode | | 1st air conditioning unit (Front) | 2nd air conditioning unit (Rear) | Opening/closing valve (Rear) |
|---|---|---|---|---|
| Cooling mode | Single cooling mode | Operated | Unoperated | Opened |
| | Dual cooling mode | | Operated | |
| Heating mode | Single heating mode | | Unoperated | Closed |
| | Dual heating mode | | Operated | |

AIR CONDITIONING SYSTEM FOR VEHICLE AND METHOD FOR CONTROLLING SAME

CROSS-REFERENCE TO RELATED APPLICATIONS

This application is a U.S. National Stage of International Application No. PCT/KR2017/007861, filed Jul. 21, 2017, which claims the benefit and priority of KR 10-2016-0093189 filed Jul. 22, 2016. The entire disclosures of each of the above applications are incorporated herein by reference.

TECHNICAL FIELD

The present invention relates to an air conditioning system for a vehicle and a method for controlling the same, and more particularly, to an air conditioning system for a vehicle and a method for controlling the same, in which an opening/closing valve and an expansion valve are installed on a branch line connecting a first air conditioning unit and a second air conditioning unit, so that the opening/closing valve is always opened in a cooling mode so as to always supply refrigerant to the second air conditioning unit and the opening/closing valve is always closed in a heating mode so as to always block the refrigerant supply to the second air conditioning unit.

BACKGROUND ART

In general, as shown in FIG. 1, an air conditioning system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and for evaporating the refrigerant to cool the air discharged to the interior of the vehicle through heat absorption by evaporative latent heat, and that the compressor 1, the condenser 2, the expansion valve 3 and the evaporator 4 are connected with one another via refrigeration pipes. The air conditioning system cools the interior of the vehicle through the following refrigerant circulation process.

When a cooling switch (not shown) of the air conditioning system is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown), which is mounted inside the air-conditioning case, and, through which coolant of the engine circulates, or by an electric heater (not shown) mounted inside the air-conditioning case.

In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside a first air conditioning unit 10; an evaporator 4 mounted on the cold air passageway 11 for cooling; and a condenser 2 mounted on the warm air passageway 12 for heating.

In this instance, at an outlet of the air conditioning unit 10, air outflow ports 15 for supplying air to the interior of the vehicle and air discharge ports 16 for discharging air to the exterior of the vehicle.

Furthermore, blowers 20 which are operated individually are respectively mounted at an inlet of the cold air passageway 11 and at an inlet of the warm air passageway 12.

Because the warm air passageway 12 and the cold air passageway 11 are arranged at right and left sides (in the width direction of the vehicle), the two blowers 20 are also arranged at right and left sides.

Therefore, in a cooling mode, cold air cooled while passing through the evaporator 4 of the cold air passageway 11 is discharged to the interior of the vehicle through the air outflow ports 15 to cool the interior of the vehicle, and in this instance, warm air heated while passing through the condenser 2 of the warm air passageway 12 is discharged to the exterior of the vehicle through the air discharge ports 16.

In a heating mode, warm air heated while passing through the condenser 2 of the warm air passageway 12 is discharged to the interior of the vehicle through the air outflow ports 15 to heat the interior of the vehicle, and in this instance, cold air cooled while passing through the evaporator 4 of the cold air passageway 11 is discharged to the exterior of the vehicle through the air discharge ports 16.

In a dehumidification mode, the air conditioning system is operated like in the cooling mode so that dried cold air passing the evaporator 4 is supplied to the interior of the vehicle to cool and dehumidify the interior of the vehicle.

Moreover, in the conventional air conditioning system, the evaporator 4 and the condenser 2 are arranged inside the first air conditioning unit 10 and a compressor 1 and an expansion valve 3 is arranged outside the air conditioning unit, so that the evaporator 4 and the condenser 2 are connected with the compressor 1 and the expansion valve 3 through a refrigerant line L.

The first air conditioning unit 10 supplies air-conditioned air to the front seat space inside the vehicle, and as shown in FIG. 2, the second air conditioning unit 50 is mounted in order to supply air-conditioned air to the rear seat space inside the vehicle.

The second air conditioning unit 50 includes a rear evaporator 51 and an electric heater 52, and the rear evaporator 51 is connected with the refrigerant line L of the first air conditioning unit 10 through a rear refrigerant line L1.

Furthermore, an expansion valve 53 for expanding refrigerant supplied to the rear evaporator 51 is mounted on the rear refrigerant line L1.

Therefore, in a single cooling mode that only the first air conditioning unit 10 is operated, the expansion valve 53 is closed so that refrigerant does not flow to the second air conditioning unit 50, but in a dual cooling mode that the first air conditioning unit 10 and the second air conditioning unit 50 are all operated, the expansion valve 53 is opened so that expanded refrigerant flows to the second air conditioning unit 50.

Additionally, in a single heating mode and a dual heating mode, the expansion valve 53 is closed so that refrigerant does not flow to the second air conditioning unit 50.

However, because the expansion valve 53 is closed in the single cooling mode that only the first air conditioning unit 10 is operated, the conventional air conditioning system has several disadvantages in that an oil circulation ratio which has influence on durability of the compressor 1 is reduced since oil remaining in the rear refrigerant line L1 of the second air conditioning unit 50 is not circulated, and in that discharged pressure of the compressor 1 rises since a flow of refrigerant to the rear refrigerant line L1 of the second air conditioning unit 50 is blocked.

In addition, the expansion valve 53 must be closed in the dual heating mode that the first air conditioning unit 10 and the second air conditioning unit 50 are all operated, but the expansion valve 53 is often opened automatically when indoor air is introduced into the second air conditioning unit 50 and temperature of an outlet of the rear evaporator 51 rises. So, in the dual heating mode, the expansion valve 53 of the rear refrigerant line L1 is operated and expanded refrigerant is supplied to the rear evaporator 51 of the second air conditioning unit 50, and it causes deterioration in heating performance using the electric heater 52 inside the second air conditioning unit 50.

DISCLOSURE

Technical Problem

Accordingly, the present invention has been made in view of the above-mentioned problems occurring in the prior art, and it is an object of the present invention to provide an air conditioning system for a vehicle and a method for controlling the same, in which an opening/closing valve and an expansion valve are installed on a branch line connecting a first air conditioning unit and a second air conditioning unit, so that the opening/closing valve is always opened in a cooling mode so as to always supply refrigerant to the second air conditioning unit and the opening/closing valve is always closed in a heating mode so as to always block the refrigerant supply to the second air conditioning unit, such that the refrigerant flows into the branch line of the second air conditioning unit even during a single cooling mode so as to prevent a pressure rise of a compressor, oil is forcibly circulated through a notch of the expansion valve so as to prevent reduction of oil circulation rate, and the refrigerant supply to the second air conditioning unit is blocked during a dual heating mode so as to prevent reduction of heating performance of an electric heater when the second air conditioning unit is operated.

Technical Solution

To accomplish the above object, according to the present invention, there is provided an air conditioning system for a vehicle including: a first air conditioning unit for supplying air-conditioned air to a first zone of the interior of the vehicle; a second air conditioning unit for supplying air-conditioned air to a second zone of the interior of the vehicle by making the refrigerant branch off from the first air conditioning unit via a branch line; an expansion valve mounted on the branch line to expand the refrigerant supplied to the second air conditioning unit; and an opening/closing valve mounted on the branch line to selectively open and close the branch line depending on a cooling mode and a heating mode.

Moreover, in another aspect of the present invention, the present invention provides a method for controlling an air conditioning system for a vehicle, which includes: a first air conditioning unit for supplying air-conditioned air to a first zone of the interior of the vehicle; and a second air conditioning unit for supplying air-conditioned air to a second zone of the interior of the vehicle by making the refrigerant branch off from the first air conditioning unit via a branch line, wherein an opening/closing valve for opening and closing the branch line is always opened in a cooling mode to always supply the refrigerant to the second air conditioning unit, and is always closed in a heating mode to always block the supply of the refrigerant to the second air conditioning unit.

Advantageous Effects

As described above, according to an embodiment of the present invention, because the air conditioning system includes the opening/closing valve and the expansion valve are installed on the branch line connecting the first air conditioning unit and the second air conditioning unit, the opening/closing valve is always opened in the cooling mode so as to always supply refrigerant to the second air conditioning unit during and the opening/closing valve is always closed in the heating mode so as to always block the refrigerant supply to the second air conditioning unit, such that the refrigerant flows into the branch line of the second air conditioning unit even during a single cooling mode so as to prevent a pressure rise of a compressor, oil is forcibly circulated through a notch of the expansion valve so as to prevent reduction of oil circulation rate and to enhance durability of the compressor.

Moreover, the refrigerant supply to the second air conditioning unit is blocked during a dual heating mode so as to prevent reduction of heating performance of an electric heater when the second air conditioning unit is operated.

DESCRIPTION OF DRAWINGS

FIG. 5 is a table showing an operational states of an opening/closing valve in cooling and heating modes of the air conditioning system for the vehicle according to the embodiment of the present invention.

MODE FOR INVENTION

Figure 1:
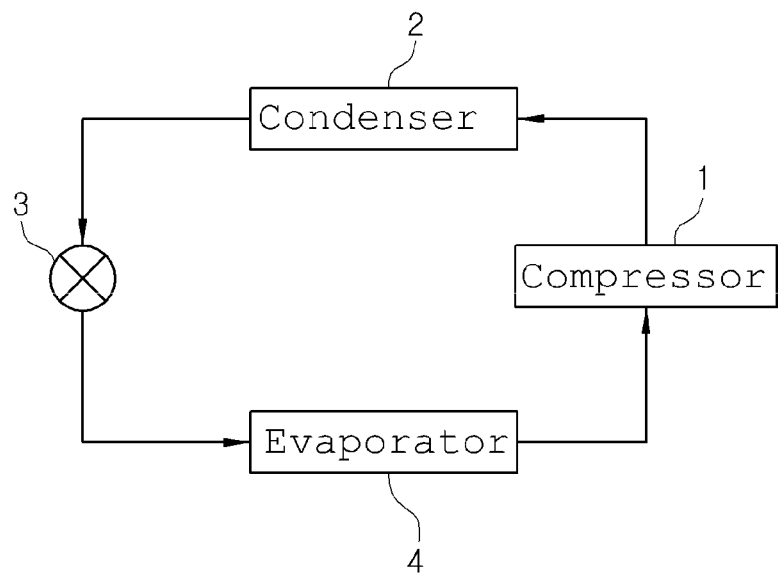
FIG. 1 is a configurative diagram of a general air conditioning system for a vehicle.
Figure 2:
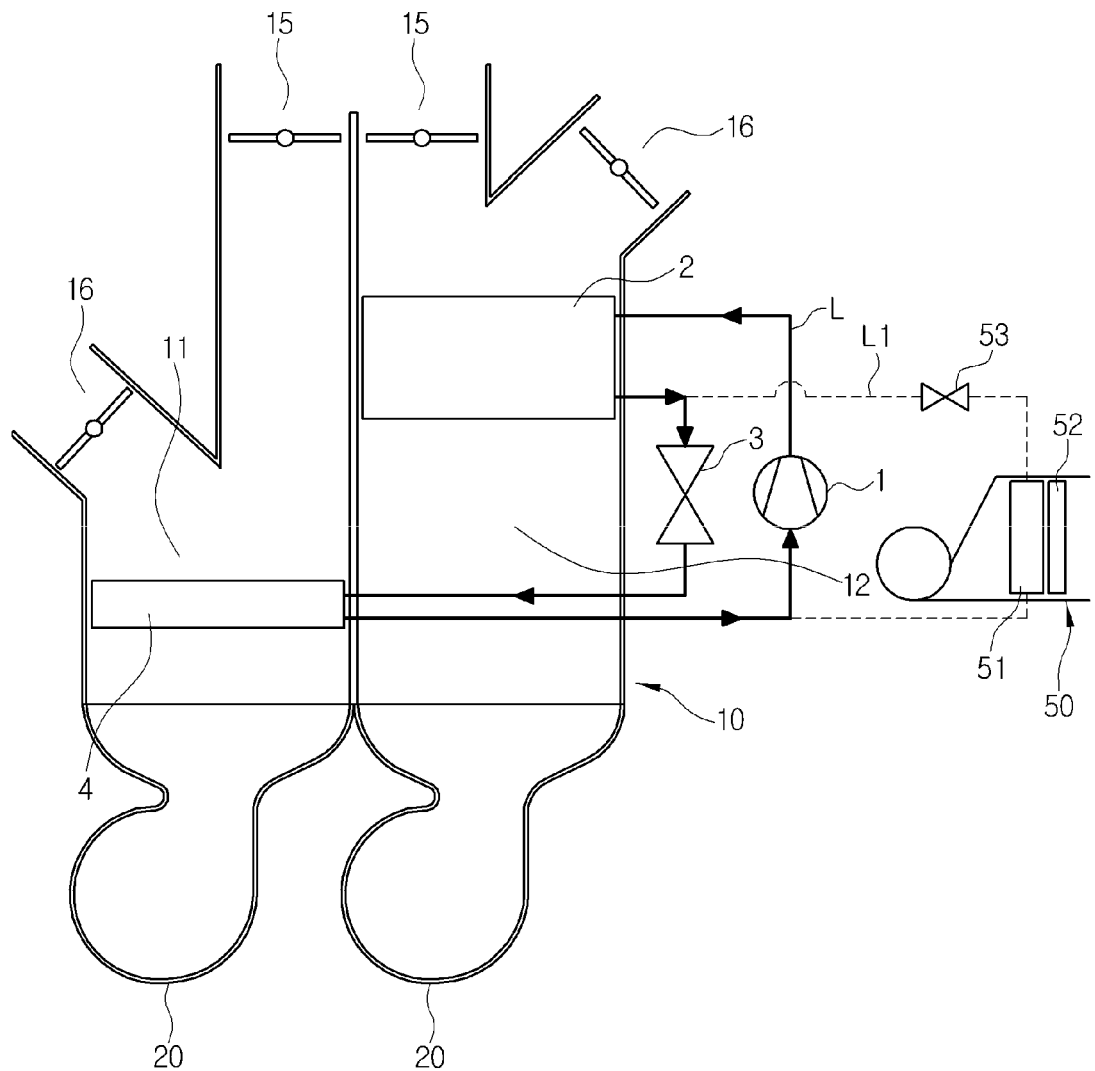
FIG. 2 is a configurative diagram of a conventional air conditioning system for a vehicle.

Reference will be now made in detail to preferred embodiments of the present invention with reference to the attached drawings.

An air conditioning system for a vehicle according to an embodiment of the present invention includes a first air conditioning unit 100 for supplying air-conditioned air to a first zone of the interior of the vehicle, and a second air conditioning unit 200 branching off from the first air conditioning unit 100 via a branch line R1 to supply air-conditioned air to a second zone of the interior of the vehicle, and is capable of being applied to various kinds of vehicles, such as hybrid vehicles or electric vehicles.

Here, the first air conditioning unit 100 supplies air-conditioned air to a front seat space, which is the first zone of the interior of the vehicle, and the second air conditioning unit 200 supplies air-conditioned air to a rear seat space, which is the second zone of the interior of the vehicle.

A compressor 10, a condenser 20, an expansion means 30, and an evaporator 40 are connected to a refrigerant line R in order so as to make refrigerant circulated.

The compressor 10 absorbs and compresses refrigerant while operating by receiving driving power from an engine (internal combustion engine) or an electric motor (not shown), and then, discharges a gas-phase refrigerant of high-temperature and high-pressure.

The condenser 20 exchanges heat between the refrigerant, which is discharged from the compressor 10 and flows through the refrigerant line R, and the air, which flows in a front air conditioning case 100a of the first air conditioning unit 100 to condense the air. The air heated through the above process is supplied to the interior of the vehicle to heat the interior of the vehicle.

That is, the condenser 20 is mounted on a warm air passageway 102 inside the front air conditioning case 100a, supplies air, which is heated while passing the condenser 20, to the interior of the vehicle during heating, and discharges the air, which is heated while passing the condenser 20, to the outside during cooling.

The expansion means 30 is an expansion valve which expands the refrigerant discharged from the condenser 20 and flowing to the evaporator 40 and adjusts a flow rate.

It is preferable that the expansion valve be an electronic expansion valve.

The evaporator 40 exchanges heat between the refrigerant discharged from the expansion means 30 and the air flowing inside the front air conditioning case 100a to evaporate the air, and during the above process, the cooled air is supplied to the interior of the vehicle to cool the interior of the vehicle.

That is, the evaporator 40 is mounted on the cold air passageway 101 inside the front air conditioning case 100a, supplies air, which is cooled while passing the evaporator 40, to the interior of the vehicle during cooling, and discharges the air, which is cooled while passing the evaporator 40, to the outside during heating.

As described above, the refrigerant of high temperature discharged after being compressed in the compressor 10 is condensed in the condenser 20 through heat exchange with the inside air of the front air conditioning case 100a, and then, flows into the expansion means 30. The refrigerant of low temperature discharged after being expanded in the expansion means 30 is evaporated in the evaporator 40 through heat exchange with the inside air of the front air conditioning case 100a, and then, circulates to the compressor 10.

The front air conditioning case 100a of the first air conditioning unit 100 includes the warm air passageway 102 on which the condenser 20 is mounted and the cold air passageway 101 on which the evaporator 40 is mounted, in order to cool and heat the front seat space, which is the first zone of the interior of the vehicle, by supplying cold air or warm air to the front seat space.

In the drawing, for convenience, the part where the condenser 20 is mounted and the part where the evaporator 40 is mounted are illustrated to be separated from each other relative to the front air conditioning case 100a, but preferably, may be formed integrally.

In other words, the warm air passageway 102 and the cold air passageway 101 are separately formed inside one front air conditioning case 100a, and the condenser 20 is mounted on the warm air passageway 102 and the evaporator 40 is mounted on the cold air passageway 101.

Moreover, the condenser 20 may include a first condensing part 21 and a second condensing part 22. In this instance, one condenser 20 may have two condensing part, namely, the first condensing part 21 and the second condensing part 22, or two condensers 20 such as the first condensing part 21 and the second condensing part 22, may be mounted.

A receiver drier 25 is mounted between the first condensing part 21 and the second condensing part 22 in order to supply liquid-phase refrigerant to the second condensing part 22 after dividing the refrigerant discharged from the first condensing part 21 into a gas-phase refrigerant and a liquid-phase refrigerant.

Because the receiver drier 25 is mounted between the first condensing part 21 and the second condensing part 22, the second condensing part 22 may be used as a subcooling area.

In the meantime, a first electric heater 120 is mounted on the warm air passageway of the first air conditioning unit 100, and in this instance, the first electric heater 120 is mounted on the warm air passageway 102 at the downstream side of the condenser 20.

Furthermore, on the cold air passageway 101 at the downstream side of the evaporator 40, a cold air mode door 110 is mounted to control a flow direction of the air to supply the air passing the evaporator 40 to the interior of the vehicle or to discharge the air to the outside.

On the warm air passageway 102 at the downstream side of the condenser 20, a warm air mode door 111 is mounted to control the flow direction of the air to supply the air passing the condenser 20 to the interior of the vehicle or to discharge the air to the outside.

Through the control of the cold air mode door 110 and the warm air mode door 111, the air passing the evaporator 40 is supplied to the interior of the vehicle and the air passing the condenser 20 is discharged out in the cooling mode, and the air passing the evaporator 40 is discharged out and the air passing the condenser 20 is supplied to the interior of the vehicle in the heating mode.

In the meantime, a blower unit 130 for blowing indoor air or outdoor air to the cold air passageway 101 and the warm air passageway 102 is mounted on the front air conditioning case 100a.

Additionally, in order to supply air-conditioned air to the rear seat space, which is the second zone of the interior of the vehicle, the second air conditioning unit 200 is mounted.

The second air conditioning unit 200 includes a rear evaporator 211 which is connected with the first air conditioning unit 100 via the branch line R1 in order to cool the rear seat space, which is the second zone of the interior of the vehicle.

In other words, the first air conditioning unit 100 can heat and cool using refrigerant, and the second air conditioning unit 200 can cool using refrigerant. Of course, the second air conditioning unit 200 has a second electric heater 212 to carry out heating using electricity.

Such a second air conditioning unit 200 includes a rear air conditioning case 200a having the rear evaporator 211 and the second electric heater 212.

In this instance, the second electric heater 212 is mounted at the downstream side of the rear evaporator 211.

The second electric heater 212 is operated to heat the rear seat space, which is the second zone of the interior of the vehicle.

Meanwhile, the rear air conditioning case 200a includes a rear blower unit 210.

Moreover, the rear air conditioning case 200a further includes a branch line R1 to let the refrigerant of the first air conditioning unit 100 branch off to the rear evaporator 211 of the second air conditioning unit 200.

In this instance, the rear evaporator 211 is connected with the refrigerant line R, which circulates the refrigerant to the condenser 20 and the evaporator 40 through the branch line R1, in parallel.

An inlet of the branch line R1 is connected with the refrigerant line R of an outlet side of the condenser 20, and an outlet of the branch line R1 is connected with the refrigerant line R of an outlet side of the evaporator 40.

Therefore, some of the refrigerant discharged from the condenser 20 is supplied to the rear evaporator 211 of the second air conditioning unit 200 through the branch line R1 to cool the air flowing inside the rear air conditioning case 200a, and then, circulates to the compressor 10.

Furthermore, an expansion valve 81 for expanding the refrigerant supplied to the second air conditioning unit 200 and an opening/closing valve 80 for selectively opening and closing the branch line R1 according to the cooling mode and the heating mode are mounted on the branch line R1.

In this instance, the opening/closing valve 80 and the expansion valve 81 are mounted on the branch line R1 of an inlet side of the rear evaporator 211.

The opening/closing valve 80 is a solenoid valve, and is mounted on the branch line R1 to be adjacent to the front end of the expansion valve 81.

The expansion valve 81 includes an expansion channel (not shown) for expanding refrigerant, and an opening/closing member (not shown) for opening and closing the expansion channel. A notch (not shown) is formed at any one of the expansion channel and the opening/closing member so that the refrigerant of a certain amount can flow even though the opening/closing member is located at a position to close the expansion channel in the cooling mode.

As described above, the expansion valve 81 has the notch structure that the refrigerant of a certain amount can always flow through the notch even in the state where the opening/closing member closes the expansion channel. Because the expansion valve 81 having the notch structure has been known, its detailed description will be omitted.

In the meantime, the opening/closing valve 80 and the expansion valve 81 may be formed individually or integrally.

Additionally, opening and closing of the opening/closing valve 80 are determined depending on the cooling mode and the heating mode, namely, the opening/closing valve 80 is operated to be always opened during the cooling mode but to be always closed during the heating mode.

Referring to FIG. 5, the action of the opening/closing valve 80 will be described in more detail. The cooling mode is divided into a single cooling mode and a dual cooling mode. In the single cooling mode, only the first air conditioning unit 100 (front air conditioning unit) is operated and the second air conditioning unit 200 (rear air conditioning unit) is not operated so as to cool only the first zone (the front seat). In the dual cooling mode, the first air conditioning unit 100 (front air conditioning unit) and the second air conditioning unit 200 (rear air conditioning unit) are all operated to cool all of the first and second zones (front seat and rear seat).

In this instance, the opening/closing valve 80 is operated to be always opened in the cooling mode, namely, is operated to be always opened regardless of the single cooling mode and the dual cooling mode.

Therefore, the opening/closing valve 80 always opens the branch line R1 in the cooling mode to always supply refrigerant to the second air conditioning unit 200.

Additionally, the heating mode is divided into a single heating mode and a dual heating mode. In the single heating mode, only the first air conditioning unit 100 is operated and the second air conditioning unit 200 is not operated so as to heat only the first zone (front seat). In the dual heating mode, the first air conditioning unit 100 and the second air conditioning unit 200 are all operated to heat all of the first and second zones (front seat and rear seat).

In this instance, the opening/closing valve 80 is operated to be always closed in the heating mode, namely, is operated to be always closed regardless of the single heating mode and the dual heating mode.

Therefore, the opening/closing valve 80 always closes the branch line R1 in the heating mode to always prevent supply of the refrigerant to the second air conditioning unit 200.

In addition, because the second air conditioning unit 200 is not operated in the single cooling mode that only the first air conditioning unit 100 is operated, the expansion valve 81 of the branch line R1 is closed. However, in the present invention, because the expansion valve 81 having the notch structure that the refrigerant can flow even in the closed state is applied, when the opening/closing valve 80 is opened (FIG. 3), the refrigerant flows into the branch line R1 even in the single cooling mode to be circulated, so it can solve the oil trap problem that oil contained in the refrigerant is blocked in the branch line R1, solve a pressure rise of the compressor 10, and prevent decrease of an oil circulation rate since oil is forcedly circulated through the notch of the expansion valve 81 so as to enhance durability of the compressor 10.

Moreover, in the dual heating mode that the first air conditioning unit 100 and the second air conditioning unit 200 are all operated, the expansion valve 81 of the branch line R1 must keep the closed state, but is often opened automatically according to peripheral variables, such as outlet temperature of the evaporator. So, the expansion valve 81 having the notch structure is applied. When the opening/closing valve 80 is closed (FIG. 4), in the dual heating mode, supply of the refrigerant to the second air conditioning unit 200 is blocked so as to solve the problem of decrease in heating performance of the second electric heater 212 when the second air conditioning unit 200 is operated in the heating mode.

In the meantime, during cooling of the rear seat of the vehicle, the refrigerant discharged from the condenser 20 flows to the branch line R1, is expanded in the expansion valve 81, and then, is supplied to the rear evaporator 211. After that, the air flowing inside the rear air conditioning case 200a is cooled while passing the rear evaporator 211, and then, is supplied to the rear seat to cool the rear seat.

Of course, during cooling of the front seat and the rear seat, the refrigerant discharged from the condenser 20 is divided into two, and then, the divided refrigerants are respectively supplied to the evaporator 40 of the front air conditioning case 100a and the rear evaporator 211 of the rear air conditioning case 200a.

Furthermore, a refrigerant parallel line R2 is connected to the refrigerant line R between the compressor 10 and the condenser 20 in parallel, and a direction changing valve 85 for changing a flow direction of the refrigerant is mounted at a branch point between the refrigerant line R and the refrigerant parallel line R2.

Additionally, a refrigerant-cooling water heat exchanger 90 for exchanging heat between cooling water circulating an electric vehicle component 91 and the refrigerant of the refrigerant parallel line R2 is mounted on the refrigerant parallel line R2.

The electric vehicle component 91 is connected with the refrigerant-cooling water heat exchanger 90 through a cooling water line W1, and a radiator 92 for cooling the cooling water and a water pump 93 for making the cooling water circulate are mounted on the cooling water line W1.

Therefore, waste heat of the electric vehicle component 91 is collected through the refrigerant parallel line R2 and the refrigerant-cooling water heat exchanger 90 so as to enhance heating performance. In this instance, whether to collect waste heat of the electric component 91 is determined by the direction changing valve 85.

For instance, if there is sufficient waste heat of the electric component 91, the direction changing valve 85 makes the refrigerant flow to the refrigerant parallel line R2, but if not so, the direction changing valve 85 blocks the flow of the refrigerant to the refrigerant parallel line R2.

Next, a method for controlling the air conditioning system for a vehicle according to an embodiment of the present invention will be described. The opening/closing valve 80 for opening and closing the branch line R1 is always opened in the cooling mode to always supply the refrigerant to the second air conditioning unit 200, and is always closed in the heating mode to always block the supply of the refrigerant to the second air conditioning unit 200.

The cooling mode is a single cooling mode that only the first air conditioning unit 100 is operated and the second air conditioning unit 200 is not operated, and the heating mode is a dual heating mode that the first air conditioning unit 100 and the second air conditioning unit 200 are all operated.

Figure 3:
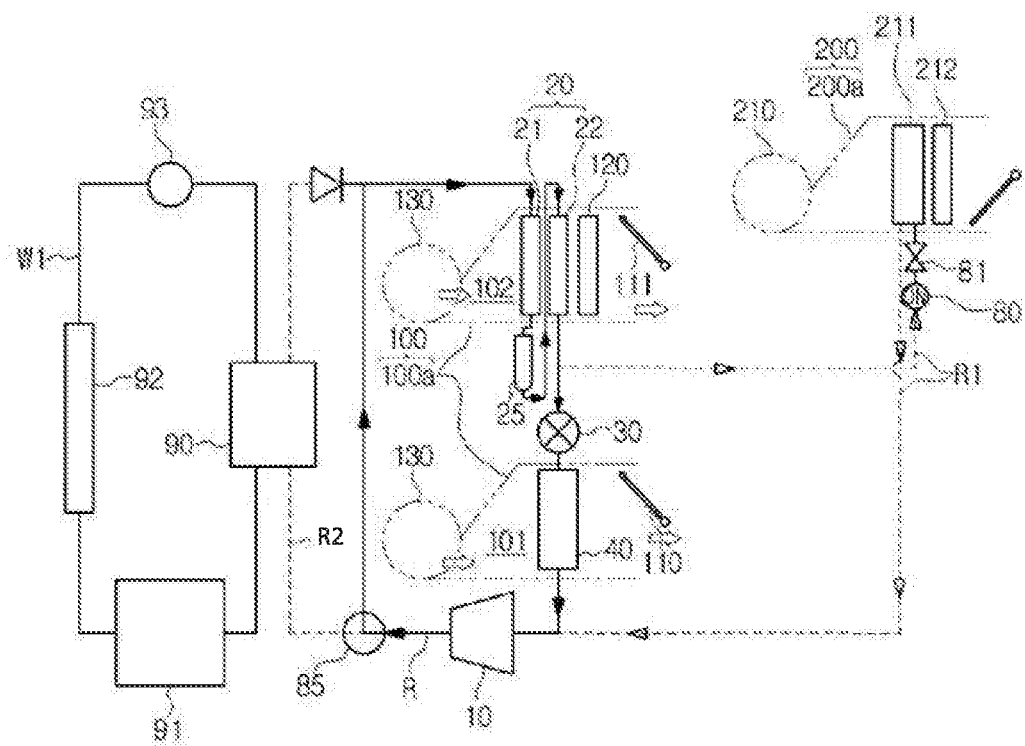
FIG. 3 is a configurative diagram showing a single cooling mode of an air conditioning system for a vehicle according to an embodiment of the present invention.
Figure 4:
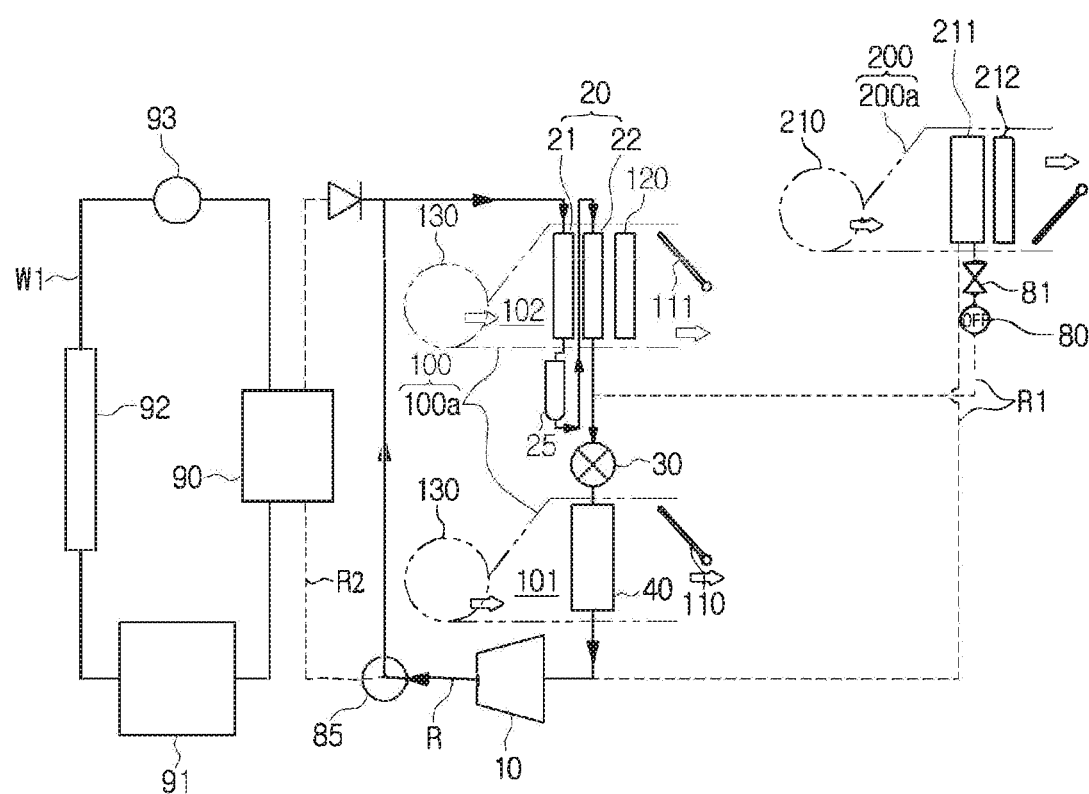
FIG. 4 is a configurative diagram showing a dual heating mode of the air conditioning system for the vehicle according to the embodiment of the present invention.

That is, in the single cooling mode, as shown in FIG. 3, the opening/closing valve 80 is always opened so that the refrigerant flows to the branch line R1, and in the dual heating mode, as shown in FIG. 4, the opening/closing valve 80 is always closed in order to block the branch line R1.

In this instance, in the single cooling mode, even though the opening/closing valve 80 is always opened, the expansion valve 81 may be in a closed state, but the expansion valve 81 having the notch structure as described above lets the refrigerant of a certain amount flows through the notch structure even in the closed state.

In the meantime, the first air conditioning unit 100 includes the warm air passageway 102 on which the condenser 20 is mounted and the cold air passageway 101 on which the evaporator 40 is mounted so as to heat and cool the front seat space, which is the first zone of the interior of the vehicle, and the second air conditioning unit 200 includes the rear evaporator 211 connected with the first air conditioning unit 100 via the branch line R1 so as to cool the rear seat space, which is the second zone of the interior of the vehicle.

Of course, the second air conditioning unit 200 can control heating through the second electric heater 212.

Hereinafter, actions of the air conditioning system for a vehicle according to the present invention will be described, and for convenience, the single cooling mode of the cooling mode and the dual heating mode of the heating mode will be described in this specification.

A. Single Cooling Mode of Cooling Mode

In the single cooling mode of the cooling mode, as shown in FIG. 3, only the first air conditioning unit 100 is operated and the second air conditioning unit 200 is not operated so as to cool the front seat space, which is the first zone of the interior of the vehicle.

In this instance, the opening/closing valve 80 of the branch line R1 is opened, and the expansion valve 81 is closed. Of course, even though the expansion valve 81 is closed, the refrigerant of a certain amount flows through the notch structure.

Therefore, the refrigerant of high temperature discharged after being compressed in the compressor 10 is condensed in the condenser 20 by exchanging heat with the air flowing through the warm air passageway 102 of the front air conditioning case 100a.

The refrigerant discharged from the condenser 20 is divided into two, and some of the refrigerant flows to the expansion means 30 of the refrigerant line R, and the rest flows to the expansion valve 81 after passing the opening/closing valve 80 of the branch line R1.

After the refrigerant flowing to the expansion means 30 of the refrigerant line R is expanded, the refrigerant flows to the evaporator 40, is evaporated by exchanging heat with the air flowing through the cold air passageway 101 of the front air conditioning case 100a, and then, flows to the compressor 10.

A small amount of the refrigerant flowing to the expansion valve 81 of the branch line R1 passes through the notch, and then, flows to the compressor 10 after passing the rear evaporator 211.

During the above process, the air heated while passing the condenser 20 is discharged out, and the air cooled while passing the evaporator 40 is supplied to the front seat space of the interior of the vehicle to cool the front seat space.

B. Dual Heating Mode of Heating Mode

In the dual heating mode of the heating mode, as shown in FIG. 4, the first air conditioning unit 100 and the second air conditioning unit 200 are all operated to heat all of the front seat space which is the first zone of the interior of the vehicle and the rear seat space which is the second zone.

In this instance, the opening/closing valve 80 of the branch line R1 is closed, and the expansion valve 81 is also closed.

Moreover, the second electric heater 212 of the second air conditioning unit 200 is operated. Of course, the rear blower unit 210 is also operated.

Therefore, the refrigerant of high temperature discharged after being compressed in the compressor 10 is condensed in the condenser 20 by exchanging heat with the air flowing through the warm air passageway 102 of the front air conditioning case 100a.

The refrigerant discharged from the condenser 20 does not flow to the branch line R1, but is the entire refrigerant flows to the expansion means 30 of the refrigerant line R.

After the refrigerant flowing to the expansion means 30 of the refrigerant line R is expanded, the refrigerant flows to the evaporator 40, is evaporated by exchanging heat with the air flowing through the cold air passageway 101 of the front air conditioning case 100a, and then, flows to the compressor 10.

During the above process, the air heated while passing the condenser 20 is supplied to the front seat space of the interior of the vehicle to heat the front seat space, and the air cooled while passing the evaporator 40 is discharged out.

Additionally, the air heated while passing the second electric heater 212 of the second air conditioning unit 200 is supplied to the rear seat space of the interior of the vehicle to heat the rear seat space.

In short, the air conditioning system for the vehicle according to the embodiment of the present invention controls the quantity of the refrigerant branching off to the second air conditioning unit 200 according to the cooling mode and the heating mode.

That is, in the heating mode including the single heating mode and the dual heating mode, because the opening/closing valve 80 is in the OFF state, the quantity of the refrigerant is zero (0). In this instance, the expansion valve is also in the OFF state.

Moreover, in the dual cooling mode, because the opening/closing valve 80 is in the ON state and the expansion valve 81 is also in the ON state, the quantity of the refrigerant increases.

Furthermore, in the single cooling mode, the opening/closing valve 80 is in the ON state but the expansion valve 81 is in the OFF state. Therefore, some of the refrigerant flows to the notch in the expansion valve 81 so that the quantity of the refrigerant decreases.

Finally, it is controlled that the quantity of the refrigerant branching off to the second air conditioning unit in the dual cooling mode is more than that in the single cooling mode.

In this embodiment, the air conditioning system for the vehicle according to the embodiment of the present invention has the thermostatic expansion valve (TXV) having the opening/closing valve and the notch, but the air conditioning system for the vehicle may have an electronic expansion valve (EXV) having a dual valve function.

The invention claimed is:

1. An air conditioning system for a vehicle comprising:
    a first air conditioning unit for supplying air-conditioned air to a first zone of the interior of the vehicle;
    a second air conditioning unit for supplying air-conditioned air to a second zone of the interior of the vehicle;
    a branch line extending from the first air conditioning unit to the second air conditioning unit to allow refrigerant to pass from the first air conditioning unit to the second air conditioning unit to allow the second air conditioning unit to supply air conditioned air to the second zone of the interior of the vehicle;
    the first air conditioning unit comprising a warm air passageway, on which a condenser is mounted, and a cold air passageway, on which an evaporator is mounted, in order to cool and heat a first zone of the interior of the vehicle, using the refrigerant;
    the second air conditioning unit comprising a rear evaporator connected with the first air conditioning unit via the branch line in order to cool a second zone of the interior of the vehicle, using the refrigerant;
    an opening/closing valve mounted on the branch line and moveable between an ON state and an OFF state depending on whether the air conditioning system is in a cooling mode or a heating mode, and wherein the opening/closing valve opens the branch line in the ON state, and closes the branch line in an OFF state;
    an expansion valve mounted on the branch line to expand the refrigerant supplied to the second air conditioning unit, wherein the expansion valve is moveable between an open state and a substantially closed state, and wherein the expansion valve allows the refrigerant to pass therethrough at a first flow rate in the open state, and wherein the expansion valve defines a notch such that fluid is able to pass therethrough at a second flow rate that is smaller than the first flow rate while in the substantially closed state;
    wherein the opening/closing valve is always opened in the cooling mode to always supply the refrigerant to the rear evaporator of the second air conditioning unit, and is always closed in the heating mode to always block the supply of the refrigerant to the rear evaporator of the second air conditioning unit;
    wherein the evaporator of the first air conditioning unit is configured such that refrigerant is provided to the evaporator of the first air conditioning unit in both the cooling mode and the heating mode;
    wherein in a single cooling mode of the cooling mode in which the first air conditioning unit is operated and the second air conditioning unit is not operated, the opening/closing valve is in the ON state, and the expansion valve is in the substantially closed state; and
    wherein in a dual cooling mode of the cooling mode in which the first air conditioning unit and the second air conditioning unit are operated, the opening/closing valve is in the ON state, and the expansion valve is in the open state.

2. The air conditioning system according to claim 1, wherein the opening/closing valve is mounted between the front end of the expansion valve and a branching point of the branch line.

3. The air conditioning system according to claim 1, wherein the expansion valve further comprises an expansion channel for expanding the refrigerant and an opening/closing member for opening and closing the expansion channel, and
    wherein the notch is formed at any one of the expansion channel and the opening/closing member so that the refrigerant can flow in the cooling mode including when the opening/closing member is located in the OFF state.

4. The air conditioning system according to claim 1, wherein the heating mode is a dual heating mode in which the first air conditioning unit and the second air conditioning unit are operated.

5. The air conditioning system according to claim 1, further comprising:
    a first electric heater mounted on the warm air passageway of the first air conditioning unit; and
    a second electric heater mounted on the second air conditioning unit.

6. The air conditioning system according to claim 1, further comprising:
    a cold air mode door mounted on the cold air passage way at the downstream side of the evaporator to control a flow direction of the air so that the air passing the evaporator is supplied to the interior of the vehicle or is discharged out, and
    a warm air mode door mounted on the warm air passageway at the downstream side of the condenser to control the flow direction of the air so that the air passing the condenser is supplied to the interior of the vehicle or is discharged out.

7. The air conditioning system according to claim 1, wherein the quantity of the refrigerant branching off to the second air conditioning unit in the cooling mode is more than that in the heating mode.

8. The air conditioning system according to claim 1, wherein the quantity of the refrigerant branching off to the second air conditioning unit in a dual cooling mode is more than that in the single cooling mode.

9. The air conditioning system according to claim 1, wherein an inlet of the branch line is connected with the refrigerant line at an outlet side of the condenser, and an outlet of the branch line is connected with the refrigerant line at an outlet side of the evaporator.

10. The air conditioning system according to claim 9, wherein the inlet of the branch line is connected with the refrigerant line between the outlet side of the condenser and an expansion means of the first air conditioning unit, and the outlet of the branch line is connected with the refrigerant line between the outlet side of the evaporator and a compressor of the first air conditioning unit.

11. A method for controlling an air conditioning system for a vehicle, comprising:
providing a first air conditioning unit for supplying air-conditioned air to a first zone of the interior of the vehicle, the first air conditioning unit including a warm air passageway on which a condenser is mounted and a cold air passageway on which an evaporator is mounted;
providing a second air conditioning unit for supplying air-conditioned air to a second zone of the interior of the vehicle, the second air conditioning unit including a rear evaporator connected with the first air conditioning unit via the branch line;
providing a branch line extending from the first air conditioning unit to the second air conditioning unit to allow refrigerant to pass from the first air conditioning unit to the second air conditioning unit;
mounting an opening/closing valve on the branch line for opening and closing the branch line;
mounting an expansion valve on the branch line for expanding refrigerant supplied to the second air conditioning unit and configured to move between an open state and a substantially closed state, wherein a first rate of flow of refrigerant may pass through the expansion valve while the expansion valve is in the open state and a second rate of flow of refrigerant may pass through the expansion valve in the substantially closed state;
activating a single cooling mode including providing refrigerant to the evaporator of the first air conditioning unit, opening the opening/closing valve allowing refrigerant to flow from the first air conditioning unit toward the second air conditioning unit, and moving the expansion valve to the substantially closed state to allow the second flow rate of flow of refrigerant to pass through the expansion valve.

12. The controlling method according to claim 11, wherein the first air conditioning unit comprises a warm air passageway on which a condenser is mounted, and a cold air passageway on which an evaporator is mounted in order to control cooling and heating of a first zone of the interior of the vehicle, using the refrigerant, and
wherein the second air conditioning unit comprises a rear evaporator connected with the first air conditioning unit via the branch line in order to control cooling of a second zone of the interior of the vehicle, using the refrigerant.

13. The controlling method according to claim 11, further including activating a dual heating mode wherein the first air conditioning unit and the second air conditioning unit are operated.

14. The controlling method according to claim 11, wherein in the single cooling mode only the first air conditioning unit is operated and the second air conditioning unit is not operated.

15. The controlling method according to claim 14, wherein the expansion valve includes an expansion channel for expanding the refrigerant supplied to the second air conditioning unit and an opening/closing member for opening and closing the expansion channel, and
wherein a notch is formed at any one of the expansion channel and the opening/closing member so that the refrigerant of a certain amount can flow in the cooling mode even in the case that the opening/closing member is located at a position to close the expansion channel.

* * * * *